United States Patent [19]

Nottingham et al.

[11] Patent Number: 5,126,520

[45] Date of Patent: Jun. 30, 1992

[54] SHIELDED COVER FOR A MICROWAVE CONTAINER

[75] Inventors: John R. Nottingham; John W. Spirk, both of Moreland Hills; Paul E. Brokaw, Euclid; Craig M. Saunders, Rocky River, all of Ohio

[73] Assignee: G & S Metal Products Company, Inc., Cleveland, Ohio

[21] Appl. No.: 674,084

[22] Filed: Mar. 25, 1991

[51] Int. Cl.$^5$ .............................................. H05B 6/64
[52] U.S. Cl. ................... 219/10.55 E; 219/10.55 F; 219/10.55 M; 99/DIG. 14; 426/107; 426/243
[58] Field of Search ............... 219/10.55 E, 10.55 F, 219/10.55 R, 10.55 B, 10.55 M, 10.55 D, 386, 10.55 A; 99/DIG. 14; 126/390; 426/107, 234, 243

[56] References Cited

U.S. PATENT DOCUMENTS

| 4,190,757 | 2/1980 | Turpin et al. | 219/10.55 E |
|---|---|---|---|
| 4,230,924 | 10/1980 | Brastad et al. | 219/10.55 E |
| 4,656,325 | 4/1987 | Keefer | 219/10.55 E |
| 4,814,568 | 3/1989 | Keefer | 219/10.55 E |
| 4,989,748 | 2/1991 | Parr, Jr. et al. | 220/367 |

Primary Examiner—Bruce A. Reynolds
Assistant Examiner—Tu Hoang
Attorney, Agent, or Firm—Pearne, Gordon, McCoy & Granger

[57] ABSTRACT

A shielded cover for a microwave container having upper and lower layers and a diamond-shaped metallic ring therebetween. The ring surrounds an upwardly extending multi-step truncated pyramid formed out of the center section of the upper and lower layers of the cover. The top surface of the truncated pyramid includes a series of openings to vent steam produced within the container. Microwave radiation produced by the microwave oven is reflected by the metallic ring and therefore only penetrates the cover to enter or exit the container at the corners and the center section of the cover. Microwaves are concentrated at the center section of the container and retained within the container, heating the center of the food therein proportionally more than the outer portion of the food, resulting food having a uniform and consistent temperature throughout.

11 Claims, 3 Drawing Sheets

SHIELDED COVER FOR A MICROWAVE CONTAINER

BACKGROUND OF THE INVENTION

1. Field of the Invention

The present invention relates generally to cooking containers which can be used in microwave ovens and, more particularly, to covers for containers which focus the microwave energy at the center portions of the food.

2. Description of the Prior Art

The heating and cooking of food in microwave ovens has become commonplace in todays society. Although the speed and convenience of microwave cooking is a great advantage, the quality, thoroughness and consistency of the temperature of the resulting food is less than ideal. Typically, because the center of the food represents a large heat sink when compared to the outer portion of the food, the temperature at the center, even if heated by the same amount of microwave energy as the rest of the food, is lower than that of the outer portions of the food. This normally results in a food product with a center that is too cold and outer portions which are too hot. If the time is increased to heat the center to the desired temperature. The outer portions are overexposed and burn.

This inability of microwave ovens to produce food of a uniform temperature was recognized early-on in the development of microwave containers and there have been several alternative approaches attempting to correct this problem, each meeting with its own level of success.

In recognition of the speed and convenience of microwave ovens as food warmers, there have been proposals to package food products in boxes or containers formed in part of a microwave reflective material such as aluminum foil having holes in selected areas. This was based on the idea that the microwave radiation would enter the package through the holes and be reflected about within the package by the aluminum foil, thereby facilitating the heating of the product. The microwave energy actually acting on the food was moderated or attenuated in the hope of improving its distribution within the food thereby uniformly heating the food. These devices are generally expensive to produce and do not focus the microwave energy acting on the food and therefore do not improve the center heating characteristics of the resulting food. U.S. Pat. Nos. 4,190,757 and 4,230,924 are exemplary of disposable covers of this type.

Another proposal is to use a special cover which is spaced a distance form the surface of the food in a metal foil container. The cover is designed such that it will not transmit reflected energy, making it possible to heat food in a metal foil container which otherwise could damage the microwave oven. Thus, the cover will allow passage of the microwave energy into the container holding the food, while substantially preventing escape of microwave radiation reflected from the food surface and the container bottom, to retain and concentrate energy within the container. This invention, while providing for efficient heating of the food and allowing use of a metallic container in the microwave oven, does not solve the problem of center heating. The resulting food has an undesirable temperature gradient, being colder in the center than at the edges, it merely reaches that undesirable temperature gradient fastener than it would without the cover, U.S. pat. No. 4,656,325 is exemplary of such a cover.

There have also been proposed microwave oven cooking container covers incorporating a microwave reflective layer to set up microwave energy modes of a higher order than is normally present in the container. The reflective layer has an irregular shape including a number of protuberances distributed around its perimeter for diffusing the heating effect of the higher order mode microwave energy. The devices of this type are designed to allow for an even heating of the food placed within the container. However, even heating of the food does not result in an even or uniform temperature due to the large heat sink represented by the center of the food as compared to the outer portions. Additionally, these devices suffer from the expense and difficulty of manufacturing reflective layers of the proper dimensions as well as the inability to heat the center of the food to a proportionally higher level than the remaining food. U.S. Pat. No. 4,814,568 is exemplary of covers of this type.

As consumer demand increases, there still exists a need for a cover for a microwave container which will concentrate and retain microwave energy within the container to heat the food proportionally more at the center than elsewhere such that the resulting food has a even temperature throughout.

SUMMARY OF THE INVENTION

In accordance with the present invention, it has now been found that the food to be cooked or warmed in a microwave oven can be more thoroughly and desirably heated at the center thereof provided that the oven is used in conjunction with the novel cover of the present invention.

More particularly, the present invention relates to a novel plastic cover for a microwave container which concentrates the microwaves produced by the magnetron of the microwave oven at the center of the microwave container where, conceivably, the center of the food is located. This concentration of microwave energy produces more heat at the center of the food, causing it to heat up more than it would otherwise, making the temperature at the center relatively the same as that found at the outer portions of the food. In dense foods such as macaroni and cheese, lasagna and the like, the center of the food requires more microwave energy to attain the same temperature as the outer portions of the food due to the proportionally larger amount of mass located at the center. The heat generated at the center of the food is conducted radially outward, warming the outer edges of the food, and correcting for any over exposure which might cause the center to heat to a higher temperature than the outer portion of the food. Hence, the center of the food is heated by the concentrated microwave energy to higher level than is attainable in the prior art, and the temperature of the food from the center to the outer periphery is uniform and consistent.

According to the invention, the cover is formed of a plastic material which is substantially transparent to microwaves. The cover includes upper and lower surfaces, each of which have a generally planar surface with a multi-step truncated pyramid middle section. The upwardly directed face of the middle section is provided with a series of slotted openings to allow the steam generated in the container to vent. The cover has a generally rectangular configuration, defined by rectilinear edge portions.

Further according to the invention, a diamond-shaped ring is provided intermediate the upper and lower surfaces of the cover. The diamond-shaped ring is formed of a thin metallic layer which is impervious to microwave radiation, usually aluminum or tin, and encircles the middle section of the cover. In the preferred embodiment of the present invention, the diamond shaped ring has four rectilinear legs which are angularly related to each other by 90 degrees and angularly related to the rectilinear edge portions of the cover by 45 degrees.

The ring reflects the microwaves generated by the microwave oven, thus, the only penetration by the microwaves is at the corners of the cover, which are unprotected by the diamond-shaped ring, and at the center via the truncated pyramid middle section. Therefore, a large portion of the microwave energy enters the container through the middle section of the cover. Similarly, more microwave energy is retained within the container because it can only exit via the cover corners and the middle section.

Therefore, the microwave energy is retained and concentrated at the center of the container, causing the food to be heated proportionally more at the center thereof, resulting in food having a uniform temperature which has been a shortcoming of the prior art.

In a second embodiment of the present invention the cover is provided with detachable legs which engage and support the cover over a food-holding plate or surface, eliminating the need for the container. This allows the positive heating characteristics of the cover to advantageously be used when the container is undesirable or unusable, for example, in the reheating of leftovers.

BRIEF DESCRIPTION OF THE DRAWINGS

A fuller understanding of the invention may be had by referring to the following description and claims taken in conjunction with the accompanying drawings, wherein:

DETAILED DESCRIPTION OF THE PREFERRED EMBODIMENTS

Figure 1:
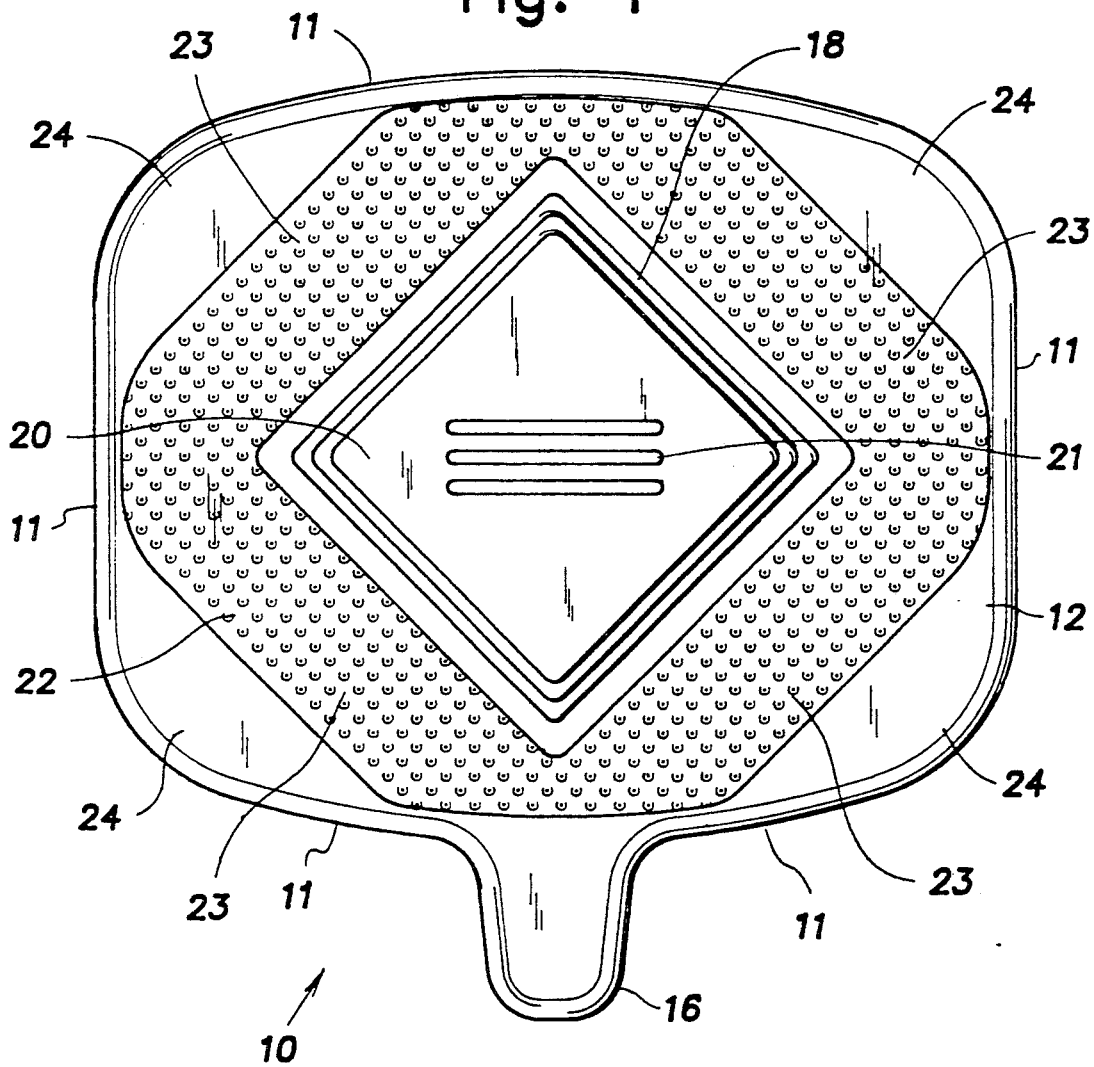
FIG. 1 is a top plan view of the present invention.
Figure 2:
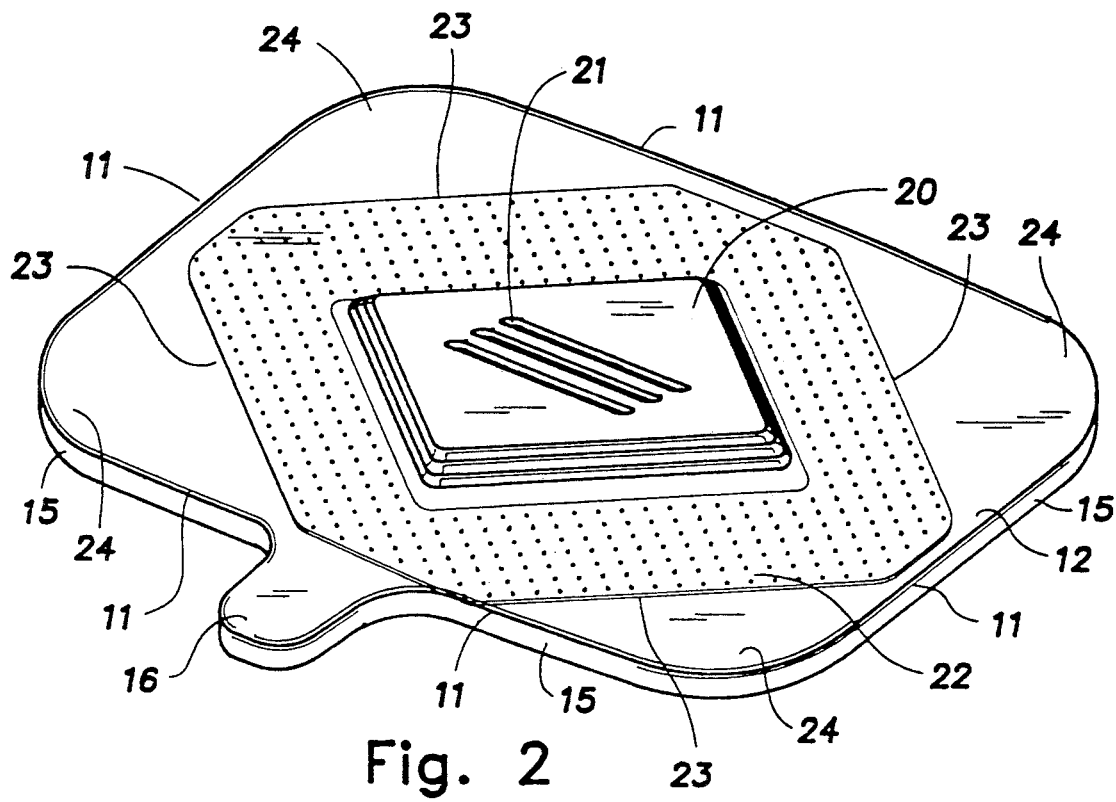
FIG. 2 is a perspective view showing the top of the present invention.
Figure 3:
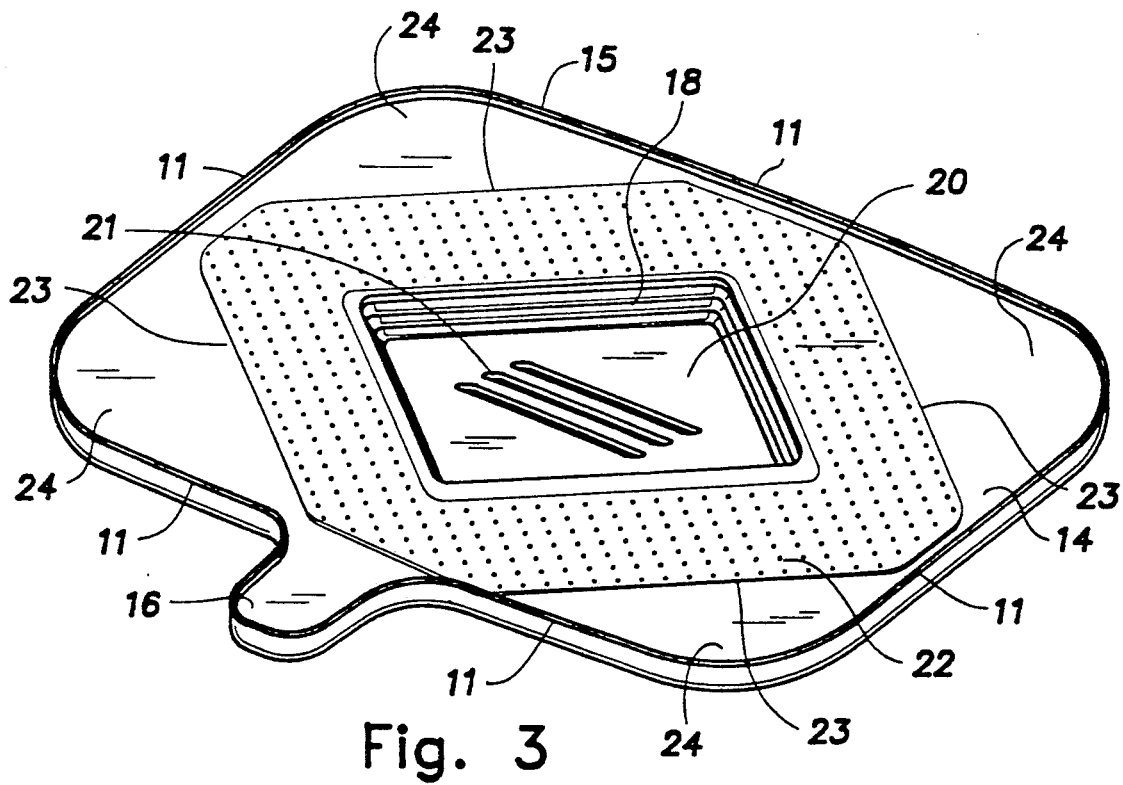
FIG. 3 is a perspective view showing the bottom of the present invention.

With reference to the drawing figures, the cover 10 of the present invention is shown. The cover is provided with upper 12 and lower 14 layers, and has a generally rectangular shape defined by rectilinear edge portions 11, which conform with the upwardly directed opening of a microwave oven container (not shown). The upper 12 and lower 14 layers cooperate to provide a downwardly extending flange-like projection 15 around the rectilinear edge portions 11 of the cover 10. The cover has a tab-like handle 16 projecting outward to facilitate lifting and repositioning of the cover.

The cover 10 at its middle or center section is provided with an upwardly extending multi-step truncated pyramid 18 which terminates in a planar top surface 20. The top surface 20 of the truncated pyramid 18 is provided with a series of small openings 21 to allow the steam produced within the container to be communicated outside thereof. Placing the openings 21 at the top surface 20 of the truncated pyramid reduces the likelihood of food being introduced into the openings and blocking them, which would disadvantageously preclude the escape of steam.

Surrounding the upwardly extending multi-step truncated pyramid 18, between the upper 12 and lower 14 layers of the cover, is a generally planar diamond-shaped ring 22. The diamond shaped ring has four rectilinear sides 23 which are angularly related to each other as well as the rectilinear edge portions 11 of the cover 10. In the preferred embodiment of the present invention as clearly shown in the drawings, the sides 23 of the ring 22 are at right angles to each other while they are at 45 degree angles to the edge portions 11 of the cover 10.

The ring 22 can be formed out of aluminum, tin, or any similar metal which will reflect microwave energy as described hereafter. The ring 22 shields a substantial portion of the surface of the cover 10, as shown in the drawings, with the exception of the center portion and the corners 24 of the cover 10.

The operation of the preferred embodiment of the present invention will hereafter be described with reference to the above mentioned drawing figures and description.

When the cover 10 is placed upon a container to at least partially seal the upwardly directed opening of the container, and the entire combination is subjected to microwave radiation, the following takes place. Microwaves directed towards the cover 10 which strike the area defined by the metallic diamond-shaped ring 22 are reflected by the metallic ring and do not penetrate the cover 10. These microwaves bounce around the interior of the microwave oven (not shown) until they can enter the container via a portion of the cover 10 not occupied by the microwave reflective ring 22. This area of possible penetration for the microwave is at the corners 24 of the cover 10, and at the middle section provided with the pyramidal structure 18. Therefore, a substantial portion of the microwaves entering the container do so through the center of the cover 10, concentrating the waves upon the center of the food within the container.

Once within the container, the microwaves penetrate the food and cause it to heat. By concentrating the microwaves at the center of the food, more microwave energy is delivered to the center where it is needed. The heat produced at the center of the food is transferred, at least partially, to the rest of the food by means of conduction. As the food heats up, steam is produced and is vented outside the container via the openings 21 on the top surface 20 of the center section 18.

Microwaves bounce around the interior of the container until they can exit the container via a portion of the cover 10 not occupied by the microwave reflective ring 22. As stated previously, the area of penetration, in this case for exiting the container, is at the cover corners 24 and the center section 18.

The retention of the microwaves within the container allows the microwave energy admitted into the container to heat the food to a greater extent than if the microwave energy were allowed to freely escape. This, coupled with the conduction heating of the food outward from the center, allows the food to warm at substantially the same rate as it would without a large portion of the microwave energy being blocked by the cover while heating the center to a desirably higher level.

Figure 4:
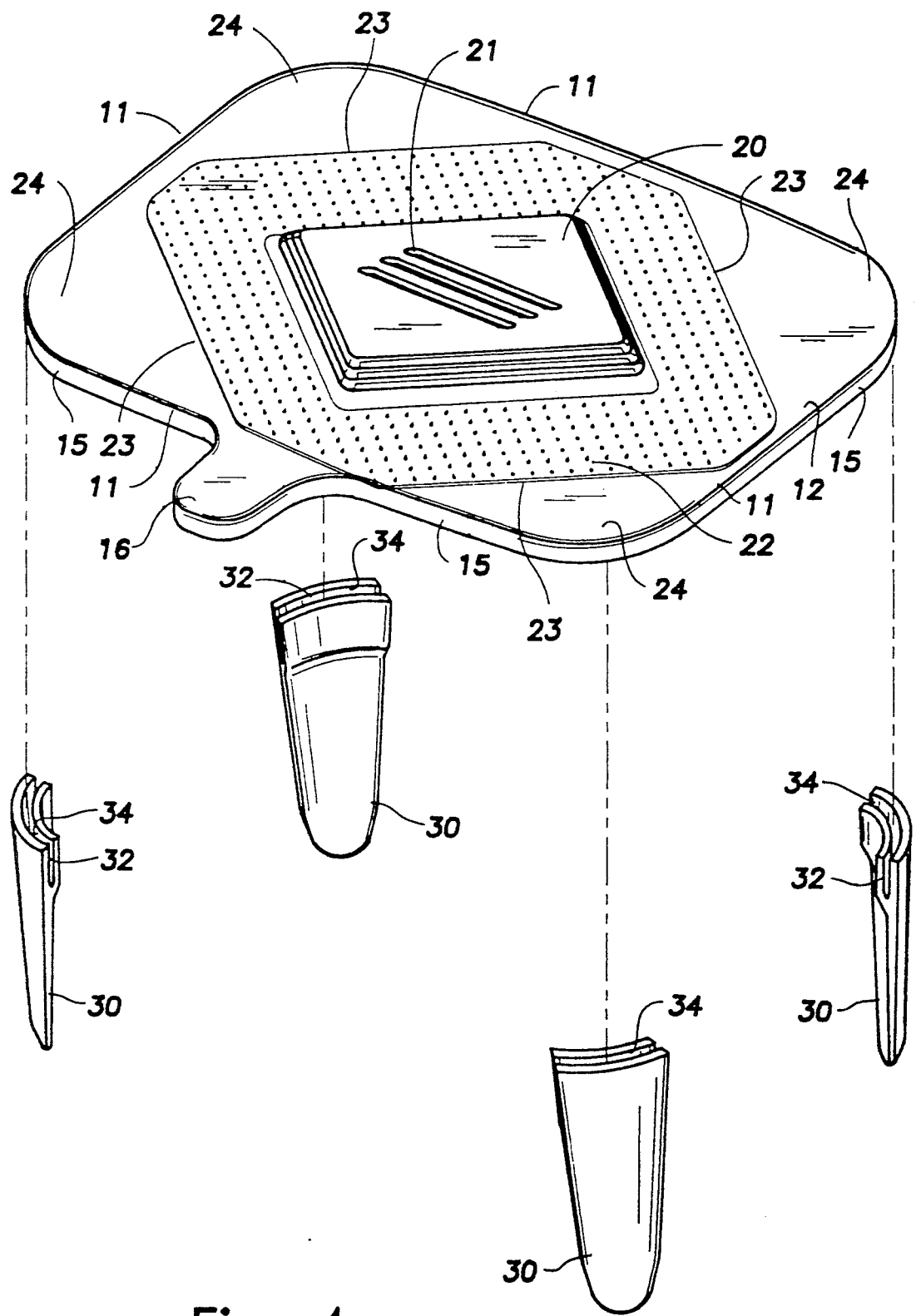
FIG. 4 is an exploded perspective view of a second embodiment of the present invention.

In a second embodiment of the present invention, as best shown in FIG. 4, the cover 10 is provided with detachable supporting legs 30 which maintain the cover a predetermined height above a food holding plate or surface (not shown). by elevating the cover above the food surface, it makes possible the use of the cover 10 in situations when the complete container and cover combination would be undesirable. The supporting legs 30 are generally tab shaped, although the final design of the legs is a matter of aesthetic and design preference and doe snot make up part of the inventive design of the present invention.

The upper extremity of each leg 30 is provided with an upwardly opening groove 32 adapted to accept the downwardly extending flange-like extension 15 of the cover 10, adjacent the corner thereof. The cover flange 15 causes the sidewalls 34 surrounding the upwardly extending groove 32 to resiliently deform, snapping the cover 10 and leg 30 together. To detach the leg 30 from the cover 10, the process is reversed whereby pressure is applied to resiliently deform the sidewalls 34 of the upwardly extending groove 32, and the leg 30 is removed from contact with the cover 10.

Although the preferred embodiment of this invention has been shown and described, it should be understood that various modifications and rearrangements of the parts may be restored to without departing from the scope of the invention as disclosed and claimed herein.

What is claimed is:

1. A cover for a microwave food container, said cover being made from a plastic material which is substantially transparent to microwaves and having a rectangular configuration defined by rectilinear edge portions. a microwave impenetrable diamond shaped ring associated with said cover to render a portion of the cover substantially opaque to microwaves, said diamond shaped ring having four rectilinear sides angularly related to each other and each being angularly related to each of said rectilinear edge portions, said diamond shaped ring surrounding a middle section of the cover, said middle section being transparent to microwaves and being sized and shaped to allow substantial portions of the microwaves entering the container through said middle section.

2. A cover for a microwave food container according to claim 1, wherein said sides are angularly related to each other by 90 degree angles.

3. A cover for a microwave food container according to claim 2, wherein each of said sides is angularly related to each of said edge portions by 45 degree angles.

4. A cover for a microwave food container according to claim 3, wherein the cover includes a raised center portion which provides a plurality of openings to vent steam produced under said cover.

5. A cover for a microwave food container according to claim 4, wherein said raised center portion includes at least one step which leads to a substantially planar upper surface, said upper surface providing said openings to vent steam.

6. A cover for a microwave food container according to claim 5, wherein said raised center portion is defines an upwardly extending multi-step truncated pyramid.

7. A cover for a microwave food container according to claim 1, said cover further comprising a middle section defining an upwardly extending multi-step truncated pyramid.

8. A cover for a microwave food container according to claim 7, wherein said multi-step truncated pyramid provides an upwardly directed face defining a plurality of openings for venting steam produced under said cover.

9. A cover for a microwave food container according to claim 1, said cover further comprising a plurality of downwardly detachable supporting legs and a downwardly extending flange along the said rectilinear edge portions of said cover, each of said legs being provided with an upwardly opening groove which detachably engages a portion of said downwardly extending flange to support said cover above a food to be heated.

10. A cover for a microwave food container according to claim 9, wherein said cover further comprises a middle section defining an upwardly extending multi-step truncated pyramid.

11. A cover for a microwave food container according to claim 10, wherein said multi-step truncated pyramid provides an upwardly directed face defining a plurality of openings for venting steam produced under said cover.

* * * * *